Richard O. Henselman
Vincent P. Catto
George R. Williges
William C. Hollyday, Jr.
Inventors By Frank T. Johmann Patent Attorney United States Patent Office 3,458,430
Patented July 29, 1969

3,458,430
SEPARATION OF HYDROCARBON WAX FROM
MINERAL OIL USING DEWAXING AIDS
Richard O. Henselman, Linden, Vincent P. Catto, Elizabeth, George R. Williges, West Orange, and William C. Hollyday, Jr., Plainfield, N.J., assignors to Esso Research and Engineering Company, a corporation of Delaware
Continuation-in-part of application Ser. No. 422,610, Dec. 31, 1964. This application May 15, 1967, Ser. No. 638,540
Int. Cl. C10g 43/08, 43/06
U.S. Cl. 208—33          18 Claims

ABSTRACT OF THE DISCLOSURE

In a process wherein hydrocarbon wax is separated from mineral oil by dissolving the wax and oil in a solvent, chilling to precipitate the wax, and filtering the precipitated wax from the oil, the improvement of adding two or more different dewaxing aids, to the wax-oil-solvent mixture at different temperatures, to improve filtration rates and facilitate the separation of said wax and oil.

Cross-reference to related applications

This application is a continuation-in-part of Serial No. 422,610 filed December 31, 1964, now abandoned, entitled: "Dewaxing Mineral Oils."

Field of invention

This invention relates to the separation of hydrocarbon oil and hydrocarbon wax, either by dewaxing of petroleum oils, or deoiling of petroleum wax, and more particularly to the use of dewaxing aids in the dewaxing of lubricating oils, or deoiling of the waxes. Waxy constituents are removed from wax-bearing oils usually lubricating oils, to produce dewaxed oils of low pour point, while deoiling further purifies the wax.

Description of the prior art

It is well known in the art to dewax waxy petroleum oils by various procedures. The oils are chilled to a temperature to precipitate wax, and the precipitated wax crystals or constituents may be removed by filtering, centrifuging, or the like. In deoiling, wax from the dewaxing operation, which contains oil, e.g. 2 to 4 wt. percent oil, enmeshed in the wax, is dissolved in a solvent by warming, followed by chilling to again precipitate out the wax, which is removed by filtering while the oil formerly dissolved in the wax is now removed in the solvent. Subsequently, the wax can be clay treated to further purify it and remove impurities, including dewaxing aids. These deoiling operations reduce the amount of oil to very low content, for example so that the wax can be used in food packaging such as wax coated bread wrappers, waxed boxes for frozen foods, etc.

In any event, the rate of filtering oil containing wax crystals is usually a bottleneck in dewaxing or deoiling operations.

It is known in the prior art to add dewaxing aids, such as Paraflow, to improve the filter rate in the dewaxing of lubricating oils containing waxes with a wide melting point distribution in order to speed up filtration. Combinations of such filter rate improving additives have been suggested but all of these components were to be added to the oil feed stream at the start of the chilling cycle.

These dewaxing aids, or filter rate improving additives, apparently function as follows: normally, the wax crystals without a dewaxing aid, tend to crystallize from the oil in the form of flat flakes. However, with dewaxing aid present, the crystals tend to become more isotropic, i.e. all sides of the crystals tend to be of about equal length, so as to resemble a cube. These isotropic crystals apparently do not pack as densely on the filter cake as the flat flakes, and therefore, allow a higher rate of filtration either in a filter operation or in a centrifuge operation.

Summary of the invention

The present invention provides a method of dewaxing petroleum oil, e.g., medium and high boiling distillates and residual stocks (bright stocks), or deoiling wax, to secure a total wax crystalline structure which can give maximum filtering rates and which can permit more rapid and more complete separation of waxes from petroleum oils than by prior methods known to the inventors. Thus, the resulting total wax crystals have a more optimum structure whereby the wax is more readily removed by filtration.

During dewaxing, or deoiling, as the temperature of the solution drops, the relatively high melting point (high molecular weight) waxes are precipitated first. As the temperature is further lowered, progressively lower melting point waxes are then precipitated. It has now been found that the effectiveness of dewaxing additive combinations can be greatly improved by a staged addition of the additive components to the oil-wax feed stream. And filter rate improvements in the oil, e.g. lubricating oil, dewaxing due to the use of additive component combinations can be greatly improved by staging the addition of the components according to their effective temperature range. Why this improvement occurs is not known with certainty. However, it may be that this staged addition prevents the long chain waxes, which precipitate first, from prematurely carrying down the additive molecules designed to interact with the later precipitating shorter chain waxes.

Where the mineral oils to be dewaxed contain waxes with a wide melting point distribution, it has been shown in the present invention that improved results are obtained by adding the one additive component i.e. dewaxing aid, designed to interact with the longer chain waxes or high melting wax which precipitate at the higher temperature, at a relatively high temperature at the start of the chilling cycle, while any other component designed to interact with the shorter chain waxes or low melting wax is added later at a lower temperature during the chilling cycle. In most cases, dewaxing aids are compounds having pendant alkyl side chains, and the length of the pendant alkyl side chain determines the effective range of the additive. The side chain has to be approximately one-half the length of the wax chain with which it is designed to interact. This fact furnishes a guide as to the selection of the dewaxing aids to be used with any particular feed as will be later illustrated.

The invention is especially adapted for use with wide cut lubricating oils (distillate or bright-stock type) which contain waxes of varying molecular weight. Selected dewaxing aids fit certain ranges of size of wax molecules and to co-crystallize with them. These lube stocks to be treated can have a viscosity at 210° F. in a range between about 35 SUS and 200 SUS and contain 3 to 30% of wax, although the invention can be practiced with other hydrocarbon stocks, e.g. with deoiling stocks which consist of wax containing oil, e.g. mixtures of 30 to 99.5% wax with the remainder being oil.

In conventional dewaxing or deoiling, a suitable solvent is added to the wax-oil feed to be treated and the resulting mixture heated to a temperature at which complete miscibility occurs between the oil, waxy constituents and dewaxing solvent. This solvent can be added all at once, or it can be added incrementally during the subsequent chilling. The solvent to be used may include conventional liquid paraffins of low boiling point (such as propane, butane, pentane, hexane, naphtha), ketones (such as methyl ethyl ketone and methyl isobutyl), aromatics (such as benzene and toluene), lower alcohols (such as methyl, ethyl, propyl and butyl alcohols), chlorinated solvents (such as 1,2 di-chloroethane and methylene chloride), etc. The amount of solvent used can be between about 1 and 10 volumes, preferably between 2 and 4 volumes, of the diluent or solvent to 1 volume of the waxy oil.

Thereafter, the mixture is chilled by direct or indirect cooling, by any of several different systems, either batch or continuous, to precipitate wax crystals. Where propane is used as a solvent, part of the propane may be released from the chilling vessel to evaporate the propane and chill the mixture in the chilling vessel by autorefrigeration. Then the chilled mixture which contains the precipitated wax crystals or material is filtered or otherwise separated from the mixture. A rotary filter or other filter may be used or centrifuges may be used. For purposes of this invention, filtration will be deemed to include centrifuging which is essentially a filtration occurring under centrifugal force. The dewaxed oil is recovered as product. The wax is also recovered as product. Solvent is recovered from the dewaxed oil and wax by conventional means. The resulting dewaxed oil has a lower pour point than the waxy oil feed. As previously mentioned, it is in the filtering step that trouble may be encountered since the rate of filtration of oil containing wax crystals or wax material is usually a bottleneck in dewaxing operations. With the present invention the rate of filtration is increased, and also less oil is generally left in the wax cake after filtering.

The invention will be further understood by reference to the accompanying drawings, wherein:

FIGURE 1 diagrammatically represents apparatus for use in carrying out the present invention in a dewaxing operation.

Figure 1:
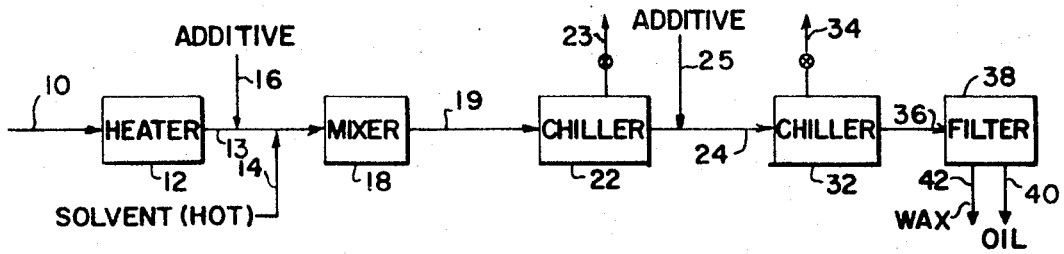
Figure 2:
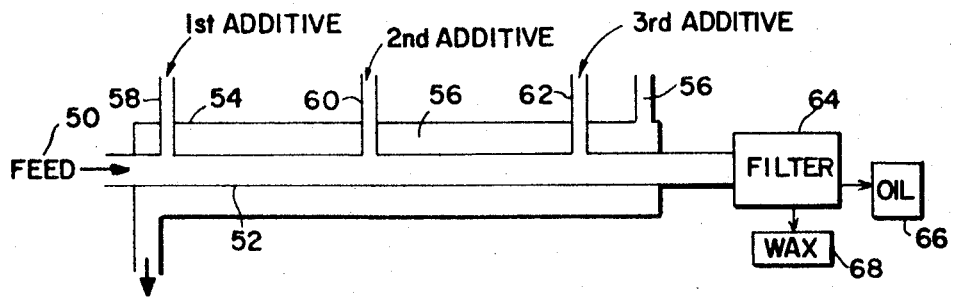
FIGURE 2 represents a continuous system utilizing the invention.
Figure 3:
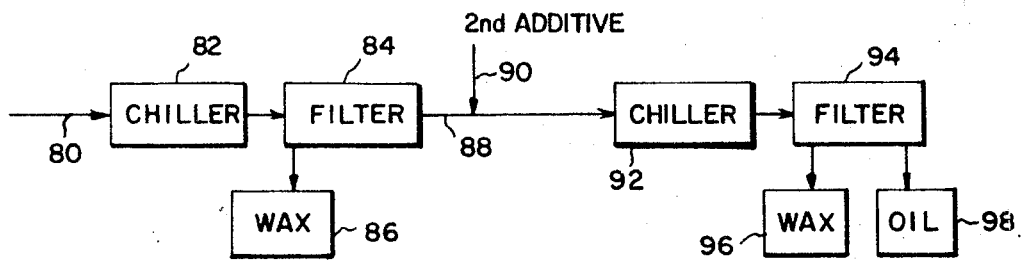
FIGURE 3 represents a system wherein the wax can be removed from the wax-oil-solvent mixture in two stages.

Referring now the FIGURE 1, the reference character 10 designates a line for introducing a waxy oil feed into a heater 12 to heat the feed to about 80° F. to 200° F. The heated feed leaves heater 12 through line 13. Line 14 is provided for introducing hot solvent at a temperature of about 70° to 150° F. into the line 13. The first dewaxing aid is added to line 13 through line 16, and is added for the high melting wax components in the oil feed. The waxy oil feed which is a distillate lube stock or a bright-stock, solvent, and dewaxing aid are at a temperature of about 80° F. to 200° F., preferably 100° F. to 150° F. to effect complete miscibility of the oil feed, solvent, waxy constituents and the dewaxing aid.

The heated oil feed, solvent and first dewaxing aid pass through line 13 and into mixer 18 for mixing the components and form a solution. The solution is then passed through heat exchanger or chiller 22 to reduce the temperature of the oil mixture or solution to about 0° F. to 80° F., preferably 15° F. to 50° F. Chiller 22 has valved outlet 23 for allowing escape of solvent to refrigerate the chiller and solution therein by, i.e. vaporization of the solvent.

The second dewaxing aid for the low melting point wax in the oil feed is added to outlet line 24 from the chiller 22 and to the cooled solution in line 24 through line 25. The second dewaxing aid which is different, but may or may not be similar to the first dewaxing aid, is added to the cooled solution leaving chiller 22. The second dewaxing aid has pendant n-alkyl groups averaging in length about one-half the length of the n-paraffins in the wax precipitating at or below the temperature of the second chilling stage after or at the addition of the second dewaxing aid.

From line 24 the oil feed and added materials pass to chilling vessel 32 where the oil feed mixture is cooled directly or indirectly to a temperature beween about +30° F. and −50° F., preferably +10° F. to −35° F. If propane or other normally gaseous paraffin hydrocarbon is used, it can be released via valved line 34 to chill the oil mixture in chilling vessel 32.

The chilling of the oil causes the waxy materials to precipitate and this slurry is passed through line 36 to filter 38 which may be a rotary filter or other filtering means to separate dewaxed oil which is withdrawn through line 40 from waxy material which is withdrawn through line 42. The solvent can be recovered from the dewaxed oil which is withdrawn from line 40. The filtered wax is preferably washed with liquid solvent on the rotary filter.

Figure II of the drawing schematically illustrates another dewaxing system using the invention showing dewaxing aids added in three stages during the cooling of the feed. Here, the wax-oil solvent feed 50 flows slowly through inner tubular conduit 52, which is encased in the outer tubular conduit 54 through which flows the countercurrent chilling medium 56. Through line 58, the first dewaxing aid additive, which is operable upon the higher molecular weight waxes, is continuously added to conduit 52 at a point where the feed is at temperature $T_1$. As the mixture of feed plus the first additive moves slowly through conduit 52, the mixture is further cooled and the higher molecular weight wax molecules present in the feed begin to precipitate. A second additive is continuously added through line 60 to the feed, which is now chilled to temperature $T_2$ and in which substantially all the higher molecular weight wax has precipitated. The second dewaxing aid additive which is now added is operable upon the medium molecular weight waxes present in the feed, which are now beginning to precipitate at $T_2$. In a similar manner, a third dewaxing aid is added continuously through line 62 to the feed which has now been further chilled to temperature $T_3$, at which temperature substantially all the medium molecular weight wax has been precipitated. The third additive is operable upon the lowest molecular weight waxes present in the feed and which are to be precipitated in the system. Finally, the effluent leaving conduit 52, which effluent is now completely chilled, and contains all the wax to be precipitated, is then filtered in filter 64 to give the dewaxed oil 66 and wax 68.

Still another system using the invention is represented diagrammatically in FIGURE III. Here feed comprising oil-wax-solvent, and the first additive which is operable on the higher molecular weight waxes present in the feed, is passed through line 80 into chiller 82, which chills the mixture to precipitate the higher melting point wax and first additive. The mixture is then passed into filter 84, which removes the higher melting point waxes 86 and first additive, while the effluent, which is the oil containing the lower molecular weight waxes, passes through line 88, where it has added to it the second dewaxing aid additive through line 90. The resulting mixture is then passed to another chiller 92, where the temperature is further reduced to precipitate the second additive and the lower melting point waxes present in the feed followed by filtering in filter 94, which separates the lower melting waxes plus second additive 96 and dewaxed oil 98.

The first dewaxing aid can comprise a material such as a polymeric alkylated aromatic hydrocarbon, or an ester polymer, such as $C_{18}$, $C_{20}$, $C_{22}$ and $C_{24}$ methacrylate polymers, $C_{18}$, $C_{20}$, $C_{22}$ and $C_{24}$ fumarate/vinyl acetate copolymers, combinations of these polymers or copolymers from $C_{18}$, $C_{20}$, $C_{22}$ and $C_{24}$ esters, or polymers prepared from esters which were prepared from mixtures of $C_{18}$, $C_{20}$, $C_{22}$ and $C_{24}$ alcohols or any other dewaxing aid for the higher melting wax component. The first dewaxing aid will usually have pendant n-alkyl groups averaging in length about one-half the length of the n-paraffins in the first wax to precipitate from the waxy oil feed. Some specific dewaxing aids follow:

Dewaxing aid "A," which was used as the first dewaxing aid in the working examples, comprises an additive prepared by the condensation of chlorinated n-paraffinic wax and naphthalene in the presence of anhydrous aluminum chloride as generally disclosed in U.S. Patents 2,174,246 and 2,297,292, modified by using a wax having a melting point of 170° F. and an average molecular weight of 554, chlorinated to 12 wt. percent chlorine, which is equivalent to 2.2 chlorine atoms per chlorinated wax molecule. This chlorinated wax is reacted in the ratio of 1.8 atoms of chlorine per molecule of naphthalene at 200° F., with a mixture of o-dichlorobenzene and a lubricant base stock as the solvent. About 0.01 to 1.0% by weight on the waxy oil feed of the dewaxing aid "A" may be used.

Other variations of the aforementioned chlorinated wax-naphthalene can be prepared. For example, the wax may have a melting point between 155 and 200° F., e.g. 155 to 185° F. (preferably between 165 and 175° F.), a molecular weight between 400 to 800, e.g. 400 to 700 (preferably between 500 and 600), and may be chlorinated to 12.0±2.0% (preferably 12.0±0.5%) chlorine. The temperature during the condensation may range from 100 to 225° F. (preferably 175 to 200° F.).

The second dewaxing aid which was used in the working examples, comprises a material selected from the group comprising dewaxing aids "B," "C," "D," "E," and "F." These dewaxing aids will hereinafter be described in greater detail. About 0.01 to 1.0 wt. percent on the waxy oil feed of the second or subsequent dewaxing aids is used.

Dewaxing aid "B' is similar to dewaxing aid "A" except that the n-paraffinic wax has a melting point of 125° F., an average molecular weight of 360, and is chlorinated to 14.5% chlorine, equivalent to 1.7 chlorine atoms per molecule of chlorinated wax. This chlorinated was is reacted in the ratio of 2.3 atoms of chlorine per molecule of naphthalene. As minor variations of this type dewaxing aid, the wax may have a melting point between 115 and 135° F. (preferably between 120 and 130° F.), a molecular weight between 325 and 400 (preferably between 350 and 370), and may be chlorinated to 14.5±2% (preferably 14.5±0.5%) chlorine. The temperature during the condensation may range from 85 to 150° F. (preferably from 100 to 125° F.).

Dewaxing aid "C" is an alkyl methacrylate polymer with alkyl groups ranging from $C_4$ to $C_{18}$ and averaging about $C_{13}$ in composition, with an inherent viscosity of 1.2 corresponding to an actual polymer molecular weight of about 85,000. The alkyl groups may average from $C_9$ to $C_{17}$ (preferably from $C_{11}$ to $C_{15}$) and the molecular weight may range from 2,000 to 200,000 (preferably from 3,000 to 100,000) in other variations of this polymer.

Dewaxing aid "D" is a copolymer of 76% ethylene and 24% vinyl acetate by weight with an inherent viscosity of 0.03 and an actual molecular weight of 2,240. The copolymerization is carried out in benzene solvent at 300° F. and 900 pounds pressure with di-tertiary butyl peroxide as the catalyst. One method of preparation of this copolymer is given in U.S. Patent 3,131,168, granted April 28, 1964. In other variations of this type, the copolymer may contain 60 to 99% (preferably 65 to 85%) ethylene and 40 to 1 (preferably 35 to 15%) vinyl acetate and the molecular weight may be between 500 and 6000 (preferably between 800 and 3000).

Dewaxing aid "E" is similar to dewaxing aid "A" except that the n-paraffinic wax has a melting point of 108° F., an average molecular weight of 310, and is chlorinated to 20.0% chlorine, equivalent to 2.2 chlorine atoms per molecule of chlorinated wax. This chlorinated wax is reacted in the ratio of 1.8 atoms of chlorine per molecule of naphthalene. In other variations of this type, the wax may have a melting point between 100 and 150° F. (preferably between 105 and 110° F.), a molecular weight between 290 and 325 (preferably between 300 and 320), and may be chlorinated to 20.0±2% (preferably 20.0±1%) chlorine. The temperature during the condensation may range from 75 to 150° F. (preferably from 100 to 125° F.).

Dewaxing aid "F" is made by alkylating polystyrene with a mixture of n-1-olefins averaging n-$C_{16}H_{32}$ in composition. The olefins range from $C_{10}$ to $C_{20}$. (In other variations of this type dewaxing aid, the average may be equivalent to $C_{14}$ to $C_{18}$, preferably $C_{15}$ to $C_{17}$.) In any case, the alkylation is carried out with a Friedel-Crafts catalyst such as aluminum chloride and in the presence of a solvent such as o-dichlorobenzene at 75 to 125° F. (preferably at 95° to 110° F.). The alkylate has an inherent viscosity of 0.03 to 1.5 (preferably 0.08 to 0.5) corresponding to a molecular weight from 700 to 2,000.

Example I

The following example shows the new results obtained:

By practicing the present invention in a laboratory pilot unit, the staged addition of dewaxing aids was done with one aid for the high melting wax in the oil feed and with three different dewaxing aids for the low melting wax in the oil feed. The oil feed was a bright stock derived from a mid-continent crude oil and had a viscosity of about 130 Saybolt Universal seconds at 210° F. The solvent used was hexane and it was used in a ratio of 3.5 of hexane by volume to 1 of oil feed by volume. About 800 cc. of bright stock with the added hexane was stirred and heated to about 150° F. Then about 0.075% by weight of dewaxing aid "A" on the oil feed as described above was added in runs 1 and 2 and 0.090% in run 3 and the mixture stirred to bring about substantially complete miscibility of the solvent, dewaxing aid and wax in the oil feed.

The mixture was then cooled to about +15° F. and the second dewaxing aid or additive was added. Here three separate additives were used. Additive "B" was used in an amount of 0.025% by weight on the oil feed in run 1, additive "B" was used in a separate test in an amount of 0.025% by weight on the oil feed in run 2, and additive "D" was used in a separate test in an amount of 0.010% by weight on the feed in run 3. These separate runs were made all using the dewaxing aid "A" in the first stage.

The mixture was then chilled to −35° F. and filtered with a leaf filter to separate the wax and to obtain dewaxed oil. The filtering rate was greatly increased over that obtained when using the same bright stock oil feed and adding the same dewaxing aids in the same amounts without staging. In this latter case the additives or dewaxing aids were added at the same temperature of 150° F. and at the same time, that is, there was no staging. The mixture was stirred and then chilled to −35° F. and filtered on the same filter as used above for filtering the mixture made according to the process of the present invention.

In one case where the two dewaxing aids were added at the same time (non-staged) at a temperature of 150° F., the mixture of dewaxing aids was "A" and "B." In the second case the mixture was of "A" and "C" and in the third case the mixture was "A" and "D" and the proportions in each case were the same as above given in the example where the dewaxing aids were added at different times.

The comparative data are given in the following table:

| Percent Additive "A" | 0.075 | | 0.075 | | 0.090 | |
|---|---|---|---|---|---|---|
| Percent Additive "B" | 0.025 | | ----- | | ----- | |
| Percent Additive "C" | ----- | | 0.025 | | ----- | |
| Percent Additive "D" | ----- | | ----- | | 0.010 | |
| Mode of Addition | Staged | Non-staged | Staged | Non-staged | Staged | Non-staged |
| Filter rate gal./hr. ft.$^2$ | 10.6 | 6.84 | 9.78 | 8.10 | 9.19 | 7.88 |
| Dewaxed oil, yield percent | 82 | 81 | 84 | 83 | 81 | 81 |
| Wax oil content, SBA at 0° F., percent | 2.2 | 4.0 | 2.5 | 3.2 | 3.5 | 4.1 |
| Oil pour point, ASTM, ° F. | +25 | +25 | +25 | +25 | +20 | +20 |

Solvent, hexane
Dilution ratio, 3.5:1
Filter temperature, ° F., −35
Differential filter pressure, in. Hg, 20
Cooling rate, ° F./min., 2
Wax content of oil feed, percent, 20

As seen by the preceding table, in each case the staged addition technique gave a higher filter rate, and resulted in a higher wax yield having a lower oil content, than using the same amounts of the same additives, but not staged.

In applying the invention to different dewaxing or deoiling operations, the actual dewaxing aid additives used, and the temperatures at which they are added will of course vary with the type of oils being dewaxed, or the types of waxes being deoiled. Although the technique of the invention is broadly applicable to oil-wax systems presently, only lubricating oils are dewaxed, since dewaxing is an expensive operation and cannot be justified except with relatively high price oils, e.g. lubricating oils. In general, these lubricating oils are prepared by dewaxing distillate oils, except that frequently bright stock, which is a deasphalted and dewaxed residual oil, is frequently blended with distillate lubricating oils to improve the quality of the lubricant and to insure that there are some high boiling components which will not evaporate. The wax contents of these oils vary considerably. For example, a distillate oil used to make a light lubricating oil, such as a 10W oil, will usually contain waxes ranging from about 18 to 28 carbon atoms and averaging about 25 carbons per molecule. These waxes will have an average melting point roughly of about 110° F. and will generally be about 90 to 95 wt. percent normal paraffin waxes with the remainder being mainly branched chain waxes. On the other hand, a distillate used to make a 60W lubricating oil will average roughly about a $C_{40}$ wax, with the waxes running from about $C_{30}$ to about $C_{50}$ and again being about 90–95% n-paraffin waxes. The residual oil used to make bright stock will contain waxes running from about $C_{40}$ to $C_{65}$. Thus, in applying the invention to a specific situation, one would normally decide the number of stages during which the additive should be added for maximum efficiency, and then what specific dewaxing aids to use and how much to use. Most commercial dewaxing aids, which invariably are also pour depressants, will represent a mixture of compounds with alkyl side groups varying over a relatively narrow carbon range, rather than being pure single compounds with all of the alkyl side chains the same length. Thus, a typical dewaxing aid might have a mixture of side chains running from 18 to 22 carbons, or 14 to 18 carbons, or 10 to 16 carbons, etc. Thus, the specific mixture of side chains in the particular filter aids being used, and the kinds and amounts of wax to be precipitated will be factors in deciding the optimum number of stages and the optimum temperatures at which each kind of filter aid will be added to the feed. For example, assuming that the cooling is to take place in two stages, then one would normally divide the wax range so as to obtain about equal amounts of wax precipitating out during both stages. Thus, if an oil used to make a 10W lubricating oil is to be dewaxed, and it contains $C_{18}$ to $C_{28}$ waxes, which are to be removed, one could decide to do the cooling in two stages wherein the first stage precipitated out mainly the $C_{24}$ to $C_{28}$ waxes, and the second stage precipitated out mainly the $C_{18}$ to $C_{23}$ waxes (actually some overlapping of different chain length waxes will occur during the precipitation as some waxes, usually those of adjacent carbon lengths will cocrystallize together). Thus, a single wax crystal might contain both $C_{20}$ and $C_{19}$ wax, or some $C_{22}$ wax might crystallize out along with higher waxes such as $C_{24}$ or $C_{25}$ waxes, etc. In applying the aforementioned rule that the most effective dewaxing aid will generally have unbranched, i.e. straight side chains (or at least an unbranched terminal portion) averaging about ½ of the length of the wax crystals to be acted upon, then the first dewaxing aid additive added should have straight side chains running from about $C_{12}$ to $C_{14}$, while the second dewaxing additive would have straight side chains running from about $C_9$ to about $C_{12}$. Also, as a rough rule, if there are about equal amounts of $C_{24}$ to $C_{28}$ wax as compared to $C_{18}$ to $C_{23}$ wax, then one would use roughly about equal amounts of the first and second dewaxing aid, assuming of course that they are of about equal effectiveness. On the other hand, if the aforementioned distillate used to make a 60W oil is to be dewaxed, wherein the spread of waxes ranges from about $C_{30}$ to $C_{50}$, and the dewaxing aid is to be added in two stages, then the first dewaxing aid could have from about 20 to 25 carbon atoms in its alkyl side groups so as to be effective on the $C_{40}$ to $C_{50}$ waxes, while the second dewaxing aid would run from about $C_{15}$ to $C_{20}$ in its alkyl groups in order to take care of the lower molecular weight waxes of $C_{30}$ to $C_{40}$. Or, if three additions of the dewaxing aids were to be made, then one could add, for example, a first dewaxing aid ranging from $C_{22}$ to $C_{25}$ alkyl side chains to correspond to the $C_{44}$ to $C_{50}$ waxes, a second dewaxing aid ranging from $C_{18}$ to $C_{22}$ in its alkyl side chains to take care of the $C_{36}$ to $C_{44}$ waxes, and a third dewaxing aid ranging from $C_{15}$ to $C_{18}$ to take care of the $C_{30}$ to $C_{36}$ waxes. The optimum amount of each dewaxing aid to be used is, of course, dependent on the amount of wax present upon which the particular dewaxing aid is effective.

To further illustrate, if the oil stock to be dewaxed is a heavy distillate or bright stock boiling above about 1000° F. at atmospheric pressure, and having a viscosity between about 120 SUS and 160 SUS at 210° F., the first dewaxing aid may, for example, be dewaxing aid "A," or a $C_{18}$ to $C_{24}$ methacrylate polymer such as a $C_{20}$ methacrylate polymer as a compound. Mixtures of polymers like $C_{18}$, $C_{19}$, and $C_{20}$ polymers may be used. A $C_{18}$ to $C_{24}$ fumarate vinyl acetate copolymer or mixtures thereof may be used, etc.

The second or subsequent dewaxing aid for the second or subsequent stage may be additive "B," additive "C," a $C_{11}$ to $C_{18}$ methacrylate polymer or a mixture of such polymers, a $C_{11}$ to $C_{18}$ fumarate vinyl acetate copolymer or a mixture thereof, or dewaxing aid "D" and the like.

If the stock to be dewaxed is a lighter oil base stock having a viscosity between about 145 Saybolt Universal Seconds and 155 SUS at 100° F., the first dewaxing aid may be dewaxing aid "B" or "C" and the like. The second or subsequent dewaxing aid may be dewaxing aids "E" or "F" which have been previously described.

Usually each dewaxing aid will be used in amounts of 0.01 to 1.0 wt. percent based on the weight of the oil-wax feed when dewaxing, and about .1 to 3 wt. percent or more when deoiling, based on the weight of the wax-oil feed. Thus, deoiling, since it involves a higher concentration of wax in the feed, will correspondingly require a higher amount of dewaxing aid. However, if the wax to be deoiled has been obtained by dewaxing using staged addition of dewaxing aids according to the invention, then less or none of the first dewaxing aid may be needed since it is already present, although more second dewaxing aid will be added at the appropriate time during chilling, since a good portion of the second dewaxing aid already in the wax will have become ineffective, etc.

As a further illustration of the invention, a deoiling operation can be performed following the general procedure of Example I, using wax from the 130 SUS at 210° F. bright stock, dissolving 1 vol. of said wax in 8 volumes of hexane at 150° F., adding 1.0% dewaxing aid "A," chilling to about +15° F., adding 1.0% dewaxed aid "B," chilling to −35° F., and centrifuging to obtain a deoiled wax.

What is claimed is:

1. In a process for separating mineral oil from hydrocarbon wax of varying molecular weight, wherein said oil and wax are dissolved in solvent to form a mixture which is then chilled to precipitate said wax which is subsequently removed by filtration, the improvement which comprises incorporating in said mixture a first dewaxing aid operable upon the higher molecular weight portion of said wax to improve its filterability, subjecting said mixture to a first chilling to precipitate said higher molecular weight portion of said wax, adding at least a second dewaxing aid operable upon a lower molecular weight portion of said wax to improve its filterability, and then performing a second chilling wherein said mixture is further chilled to precipitate said lower molecular weight portion of said wax, wherein said first dewaxing aid is selected from the group consisting of a condensation product of naphthalene and chlorinated paraffin wax having a melting point between about 155° F. and 185° F. before chlorination and having a molecular weight between about 400 and 700, $C_{18}$, $C_{20}$, $C_{22}$ and $C_{24}$ methacrylate polymers, $C_{18}$, $C_{20}$, $C_{22}$ and $C_{24}$ fumarate-vinyl acetate copolymers, combinations of said polymers or copolymers from $C_{18}$, $C_{20}$, $C_{22}$ and $C_{24}$ esters, and polymers prepared from esters which were prepared from mixtures of $C_{18}$, $C_{20}$, $C_{22}$ and $C_{24}$ alcohols, and wherein said second dewaxing aid is selected from the group consisting of a condensation product of naphthalene and chlorinated paraffin wax having a melting point between about 115° F. and 135° F. before chlorination and having a molecular weight between about 325 and 400, a $C_4$–$C_{18}$ methacrylate polymer, a copolymer of ethylene and vinyl acetate, a condensation product of naphthalene and chlorinated paraffin wax having a melting point between about 100° F. and 150° F. before chlorination and having a molecular weight between 290 and 325, and an alkylated product made by alkylating polystyrene with a mixture of n-1-olefins averaging n-$C_{16}H_{32}$ in composition and having a molecular weight between about 700 and 2000.

2. In a process according to claim 1, wherein the mixture of oil-wax-solvent is filtered after said first chilling to remove said high molecular weight portion of said wax, and the remaining oil-wax-solvent mixture is again filtered after said second chilling to remove said lower molecular weight portion of said wax.

3. A method according to claim 1, wherein the mixture of oil-solvent-wax is filtered only upon the completion of said second chilling.

4. A method according to claim 3, wherein said process is continuous, the mixture of oil-wax-solvent and first dewaxing aid passes through a chilling conduit wherein said mixture is progressively chilled, and said second dewaxing aid is added to said mixture downstream of the point of addition of said first dewaxing aid.

5. A method according to claim 1, wherein said process is a dewaxing process for a lubricating oil distillate feed.

6. A method according to claim 1, wherein said process is a deoiling process wherein wax from a prior dewaxing operation is further deoiled.

7. A method according to claim 1, wherein said filtration is carried out by centrifuging.

8. A method according to claim 1, wherein said filtration is carried out by a rotary filter.

9. A process for dewaxing mineral oils and improving the filtering rate of the separated wax which comprises adding a dewaxing solvent to a wax-containing mineral oil, heating the mixture to a temperature sufficient to form a miscible solution, adding a small amount of a condensation product of an aromatic compound and chlorinated paraffin wax having a melting point above about 155° F. before chlorination at an elevated temperature as a dewaxing aid, cooling the so-treated mineral oil, then adding a small amount of a second and different dewaxing aid to the mineral oil, said second aid being similar to said first dewaxing aid but being made from a wax having a melting point below about 150° F., then chilling the cooled mineral oil to precipitate out the waxy material in a filterable form and then separating the precipitated waxy material from the oil.

10. A process for dewaxing mineral oils which comprises adding a dewaxing solvent to a wax-containing mineral oil, heating the mixture to a temperature sufficient to form a miscible solution, adding a small amount of a condensation product of an aromatic hydrocarbon and chlorinated paraffin wax having a melting point between about 155° F. and 185° F. before chlorination and having a molecular weight between about 400 and 700 at an elevated temperature as a first dewaxing aid, cooling the so-treated mineral oil, then adding a small amount of a second and different dewaxing aid to the mineral oil, said second dewaxing aid being similar to said first dewaxing aid but being made from a chlorinated wax having a melting point between about 100° F. and 150° F. before chlorination and having a molecular weight between about 290 and 325, then chilling the cooled mineral oil to precipitate out the waxy material in a filterable form and then separating the precipitated waxy material from the oil.

11. A process for dewaxing mineral oils which comprises adding about 1 to about 10 volumes of a dewaxing solvent based on the oil to a wax-containing mineral oil, heating the mixture to a temperature sufficient to form a miscible solution, adding a small amount between about 0.1 and 1.0 wt. percent of a condensation product of naphthalene and chlorinated paraffin wax having a melting point between about 155° F. and 185° F. before chlorination and having a molecular weight between about 400 and 700 at an elevated temperature between about 80° F. and 200° F. as a dewaxing aid, cooling the so-treated mineral oil to a temperature between about 0° F. and 80° F., then adding a small amount between about 0.1 and 1.0 wt. percent of a second and different dewaxing aid to the mineral oil, said second aid being similar to said first dewaxing aid but being made from a chlorinated wax having a melting point between about 100° F. and 150° F. before chlorination and having a molecular weight between about 290 and 325, then chilling the cooled mineral oil to a temperature between about −35° F. to +10° F. to precipitate out the waxy material in a filterable form and then separating the precipitated waxy material from the oil to produce a dewaxed oil product.

12. A process for dewaxing mineral oils which comprises adding about 1 to about 10 volumes of a dewaxing solvent based on the oil to a wax-containing mineral oil, heating the mixture to a temperature sufficient to form a miscible solution, adding a small amount between about 0.1 and 1.0 wt. percent of a material selected from the group consisting of a condensation product of naphthalene and chlorinated paraffin wax having a melting point between about 155° F. and 185° F. before chlorination and having a molecular weight between about 400 and 700, $C_{18}$, $C_{20}$, $C_{22}$ and $C_{24}$ methacrylate polymers, $C_{18}$, $C_{20}$, $C_{22}$ and $C_{24}$ fumarate vinyl acetate copolymers, combinations of said polymers or copolymers from $C_{18}$, $C_{20}$, $C_{22}$ and $C_{24}$ esters, polymers prepared from esters which were prepared from mixtures of $C_{18}$, $C_{20}$, $C_{22}$ and $C_{24}$ alcohols, at an elevated temperature as a dewaxing aid for the high melting point wax constituents in the mineral oil, cooling the so-treated mineral oil, then adding a small amount between about 0.1 and 1.0 wt. percent of a second and different dewaxing aid for the low melting point wax constituents in the mineral oil, said second aid being selected from the group consisting of a condensation product of naphthalene and chlorinated paraffin wax having a melting point between about 115° F. and 135° F. before chlorination and having a molecular weight between about 325 and 400, a $C_4$–$C_{18}$ methacrylate polymer, a copolymer of ethylene and vinyl acetate, a condensation product of naphthalene and chlorinated paraffin wax having a melting point between about 100° F. and 150° F. before chlorination and having a molecular weight between 290 and 325, and an alkylated product made by alkylating polystyrene with a mixture of n-1-olefins averaging n-$C_{16}H_{32}$ in composition and having a molecular weight between about 700 and 2000, then chilling the cooled mineral oil to precipitate out the waxy material in a filterable form and then separating the waxy material from the oil.

13. A process for dewaxing mineral oils which comprises adding about 1 to about 10 volumes of a dewaxing solvent based on the oil to wax-containing mineral oil, heating the mixture to a temperature sufficient to form a miscible solution, adding a small amount between about 0.1 and 1.0 wt. percent of a condensation product of an aromatic hydrocarbon and chlorinated paraffin wax having a melting point between about 155° F. and 185° F. before chlorination and having a molecular weight between about 400 and 700 at an elevated temperature as a dewaxing aid for the high melting point wax constituents in the mineral oil, cooling the so-treated mineral oil, then adding a small amount between about 0.1 and 1.0 wt. percent of a second and different dewaxing aid for the low melting point wax constituents in the mineral oil, said second aid being similar to said first dewaxing aid but being made from a chlorinated paraffin wax having a melting point between about 100° F. and 150° F. before chlorination and having a molecular weight between about 290 and 325, then chilling the cooled mineral oil to precipitate out the waxy material in a filterable form and then separating the waxy material from the oil.

14. A process for dewaxing mineral oils which comprises adding about 1 to about 10 volumes of a dewaxing solvent based on the oil to a wax-containing mineral oil, heating the mixture to a temperature sufficient to form a miscible solution, adding a small amount between about 0.1 and 1.0 wt. percent of a condensation product of an aromatic hydrocarbon and chlorinated paraffin wax havheating the mixture to a temperature sufficient to forming a melting point between about 155° F. and 185° F. before chlorination and having a molecular weight between about 400 and 700 at an elevated temperature as a dewaxing aid for the high melting point wax constituents in the mineral oil, cooling the so-treated mineral oil, then adding a small amount between about 0.1 and 1.0 wt. percent of a second and different dewaxing aid for the low melting point wax constituents in the mineral oil, said second aid comprising a copolymer of ethylene and vinyl acetate and having a molecular weight between about 500 and 6000, then chilling the cooled mineral oil to precipitate out the waxy material in a filterable form and then separating the waxy material from the oil.

15. A process for dewaxing mineral oils which comprises adding about 1 to about 10 volumes of a dewaxing solvent based on the oil to a wax-containing mineral oil, heating the mixture to a temperature sufficient to form a miscible solution, adding a small amount between about 0.1 and 1.0 wt. percent of a condensation product of naphthalene and chlorinated paraffin wax having a melting point between about 155° F. and 185° F. before chlorination and having a molecular weight between 400 and 700 at an elevated temperature as a dewaxing aid for the high melting point wax constituents in the mineral oil, cooling the so-treated mineral oil, then adding a small amount between about 0.1 and 1.0 wt. percent of a second and different dewaxing aid for the low melting point wax constituents in the mineral oil, said second aid comprising an alkyl methacrylate polymer with alkyl groups ranging from $C_4$ to $C_{18}$ and having a molecular weight between about 2000 and 200,000, then chilling the cooled mineral oil to precipitate out the waxy material in a filterable form and then separating the waxy material from the oil.

16. A process for dewaxing heavy mineral oils having an SUS viscosity above about 130 at 210° F. which comprises adding about 1 to about 10 volumes of a dewaxing solvent based on the oil to a wax-containing mineral oil, heating the mixture to a temperature sufficient to form a miscible solution, adding a small amount between about 0.1 and 1.0 wt. percent of a condensation product of naphthalene and chlorinated paraffin wax having a melting point between about 155° F. and 185° F. before chlorination and having a molecular weight between about 400 and 700 at an elevated temperature as a dewaxing aid for the high melting point wax constituents in the mineral oil, cooling the so-treated mineral oil, then adding a small amount between about 0.1 and 1.0 wt. percent of a second and different dewaxing aid for the low melting point wax constituents in the mineral oil, said second aid being selected from the group consisting of a condensation product of naphthalene and chlorinated paraffin wax having a melting point between about 100° F. and 150° F. before chlorination and an alkyl methacrylate polymer having alkyl groups ranging from $C_4$ to $C_{18}$ and having a molecular weight between about 2000 and 200,000, then chilling the cooled mineral oil to precipitate out the waxy material in a filterable form and then separating the waxy material from the oil.

17. A process for dewaxing light mineral oils having an SUS viscosity at 100° F. below 155 which comprises adding about 1 to about 10 volumes of a dewaxing solvent to a wax-containing mineral oil based on the oil, heating the mixture to a temperature sufficient to form a miscible solution, adding a small amount between about 0.1 and 1.0 wt. percent of a material selected from the group consisting of condensation product of naphthalene and chlorinated paraffin wax having a melting point between about 115° F. and 135° F. before chlorination and having a molecular weight between about 325 and 400 and an alkyl methacrylate polymer having alkyl groups ranging from $C_4$ to $C_{18}$, at an elevated temperature as a dewaxing aid for the high melting point wax constituents in the light mineral oil, cooling the so-treated mineral oil, then adding a small amount between about 0.1 and 1.0 wt. percent of a second and different dewaxing aid for the low melting point wax constituents in the mineral oil, said second aid being selected from the group consisting of a condensation product of naphthalene and a chlorinated paraffin wax having a melting point between about 100° F. and 150° F. before chlorination and having a molecular weight between about 290 and 325 and an alkylated product made by alkylating polystyrene with a mixture of n-1-olefins averaging n-$C_{16}H_{32}$ in composition and having a molecular weight between 700 and 2000, then chilling the cooled mineral oil to precipitate out the waxy material in a filterable form and then separating the waxy material from the oil.

18. A process for dewaxing bright stock which comprises adding a solvent to the bright stock, adding a small amount of about 0.075 wt. percent of a condensation product of naphthalene and chlorinated paraffin wax having a melting point between about 155° F. and 185° F. before chlorination and having a molecular weight between about 400 and 700 to the bright stock at an elevated temperature of about 150° F. as a dewaxing aid for the high melting point wax constituents in the bright stock, cooling the so-treated bright stock to about 15° F., then adding a small amount of about 0.025 wt. percent of a second and different dewaxing aid to the bright stock, said second aid being similar to said first dewaxing aid but being made from a chlorinated wax having a melting point between about 100° F. and 150° F. before chlorination and having a molecular weight between about 290 and 325, then chilling the cooled bright stock to a temperature of about −35° F. to precipitate out the waxy material in a filterable form and then separating the precipitated waxy material from the oil.

References Cited

UNITED STATES PATENTS

| | | | |
|---|---|---|---|
| 2,158,358 | 5/1939 | Evans | 208—33 |
| 2,260,994 | 10/1941 | Knowles | 208—33 |
| 2,798,027 | 7/1957 | Cohen | 208—38 |
| 2,972,641 | 2/1961 | Herzel et al. | 252—59 |
| 3,037,850 | 6/1962 | Wythe et al. | 44—62 |
| 3,052,623 | 9/1962 | Edwards et al. | 208—38 |
| 3,108,944 | 10/1963 | Stoller | 208—33 |
| 3,131,168 | 4/1964 | Ilncykyj et al. | 260—87.3 |
| 3,239,445 | 3/1966 | Leonard et al. | 208—33 |
| 3,262,873 | 7/1966 | Tiedje et al. | 208—33 |

FOREIGN PATENTS 591,621  8/1947  Great Britain.

HERBERT LEVINE, Primary Examiner

U.S. Cl. X.R.

208—35; 260—33.4